Patented June 6, 1939

2,160,903

UNITED STATES PATENT OFFICE 2,160,903

POLYMERIC VINYLIDENE CHLORIDE

John H. Reilly and Ralph M. Wiley, Midland, Mich., assignors to The Dow Chemical Company, Midland, Mich., a corporation of Michigan No Drawing. Application October 9, 1937, Serial No. 168,200

1 Claim. (Cl. 260—80)

This invention relates to the polymeric product prepared from vinylidene chloride which boils at 31.5°–32° C. under 760 millimeters pressure and having the specific gravity 1.221 at 15°/4° C. A material boiling at 33.8°–38° C. at atmospheric pressure, specific gravity 1.250 at 15°/4° C. has been reported by Staudinger et al., Helv. Chim. Acta 13, 832–843 (1930), to polymerize rapidly even in the dark, with the formation of a white powder which is completely soluble in boiling tetrachloroethane, somewhat soluble in the usual organic solvents, e. g. chloroform, carbon bisulphide, ethylene bromide, and benzene, and which decomposes with charring and splitting out of hydrogen chloride when heated to a temperature of approximately 120° C.

We have now found that the vinylidene chloride polymerized by Staudinger was not pure, and that when vinylidene chloride is distilled under carefully controlled conditions in the absence of oxygen, a vinylidene chloride boiling at 31.5°–32° C. under 760 millimeters pressure is obtained. We have further discovered that such substantially pure vinylidene chloride polymerizes less readily than does the material previously known, but that when said pure compound is polymerized, it yields a polymeric product entirely distinct from, and possessing properties superior to, that described by Staudinger et al.

Our new polymer prepared from vinylidene chloride boiling between 31.5° and 32° C., at 760 millimeters pressure, is only sparingly soluble (less than 4 per cent by weight) in boiling tetrachloroethane and is insoluble in chloroform, carbon bisulphide, ethylene bromide, and benzene. Furthermore, it is substantially unchanged in composition when heated in a glass container at 180° C. for one hour. Our new polymeric product may be obtained in a variety of physical forms, e. g. powder, soft porous solid, or hard bone-like material depending on the extent of polymerization. The polymeric product is specially resistant to chemical attack by acids, bases, and oxidizing agents. It can be molded by the application of heat and pressure into translucent or nearly transparent articles.

The polymerization rate of vinylidene chloride boiling between 31.5° and 32° C., at 760 millimeters pressure, can be accelerated by heating under pressure at temperatures up to 125° C. in the presence of certain catalysts such as ozone and organic peroxides, and by the action of light.

The physical form of the product changes as polymerization progresses. Thus, if the process is stopped when only about 20 per cent of the vinylidene chloride has been polymerized, the product is obtained as a white powder. If polymerization is interrupted when from 40 to 50 per cent polymerization has occurred, the product is obtained as a highly porous mass. A hard, bone-like product is obtained when the polymerization is carried nearly to completion. In any case, the polymerized product is preferably dried by distilling off any unpolymerized material. The powdered and porous forms, because of their structure and inertness toward most chemicals, are well adapted to use as filter-aids in filtering corrosive liquids.

The following examples illustrate certain ways in which the principle of our invention has been applied, but are not to be construed as limiting the invention:

EXAMPLE 1

*Preparing a bone-like polymerized product*

1000 grams of vinylidene chloride, boiling at 31.8° C. under 760 millimeters pressure and having a specific gravity of 1.221 at 15°/4° C., was heated with 10 grams of benzoyl peroxide to a temperature of 60° C. in a closed container for 36 hours. There was obtained 1000 grams of a hard, bone-like, white polymer, which was unattacked by sulphuric acid, hydrofluoric acid, nitric acid, sodium hydroxide, potassium hydroxide, or a solution of potassium dichromate in sulphuric acid, when immersed therein at room temperature.

EXAMPLE 2

*Preparation of a light, porous product*

A mixture of 1000 grams of vinylidene chloride boiling at 31.8° C. under 760 millimeters pressure and 10 grams of benzoyl peroxide was allowed to stand in a closed glass container at a temperature between 25° and 30° C. for eighty hours. The unpolymerized vinylidene chloride was then distilled from the mixture, leaving 300 grams of a solid but highly porous vinylidene chloride mass as the still residue. The product was resistant to attack by the acids, bases, and oxidizing agents mentioned in Example 1.

This application is a continuation-in-part of our prior application Serial Number 33,126, filed July 25, 1935.

Other modes of applying the principle of our invention may be employed instead of those explained, change being made as regards the materials employed, provided the ingredients stated by any of the following claim, or the equivalent of such stated ingredients be employed.

We therefore particularly point out and distinctly claim as our invention:

The product obtained by polymerizing monomeric vinylidene chloride having a boiling point between 31.5° and 32° C., inclusive, which product is substantially insoluble in boiling chloroform, carbon bisulphide, ethylene bromide, or benzene, sparingly soluble in boiling tetrachloroethane, substantially unchanged in composition when heated in a glass container at 180° C. for one hour, and resistant to attack by acids, bases, and oxidizing agents at room temperature.

JOHN H. REILLY.
RALPH M. WILEY.